Sept. 13, 1960 L. E. SHUMAKER ET AL 2,952,324
CUTTER HEAD
Filed May 6, 1955 2 Sheets-Sheet 1

INVENTORS.
Lawrence E. Shumaker
Cecil I. Beck
BY

ATTORNEYS

Sept. 13, 1960

L. E. SHUMAKER ET AL 2,952,324

CUTTER HEAD

Filed May 6, 1955

INVENTORS.
Lawrence E. Shumaker
Cecil I. Beck
BY

ATTORNEYS

United States Patent Office 2,952,324
Patented Sept. 13, 1960

2,952,324

CUTTER HEAD

Lawrence E. Shumaker and Cecil I. Beck, Denver, Colo., assignors to Eversman Mfg. Company, Denver, Colo., a corporation of Colorado Filed May 6, 1955, Ser. No. 506,422

4 Claims. (Cl. 172—550)

This invention relates to agricultural plant thinners and more particularly to a thinning head requiring only a single type of thinning blade adapted to provide an infinite number of blade settings for making any desired percentage of cut along a row of crops.

Agricultural thinners and blockers have been long known, especially, in the sugar beet and cotton farming areas. Recently, extensive scientific testing has proved the value of "twice over" thinning of a field of crops with a mechanical thinner. In this system, a mechanical thinner is used to thin a field in one direction, and a short time later it is used in the same field in the opposite direction to make two different types of cuts along the rows of plants. The first thinning with a mechanical thinner normally removes or cuts fifty percent of the row. The second time over removes still more of the stand to leave a specific number of plants per unit length of crop row. This system provides not only excellent thinning, but, also, a substantial amount of weeding done with the thinning. The twice over system is very useful for all except very thin stands of crops, that is, rows in which the seed germination or plant stand is very low.

The thinners of the prior art may be utilized to thin by the "twice over" system, but since a substantial number of different types of cuts are required, depending on the plant stand, the thinning head must be able to accommodate various sizes of knives as well as various numbers of the knives. A stand of sugar beets, at the time when thinning is necessary, in general runs from about thirteen to fifty-six plants per one hundred inches of row. In some areas of farming sugar beets, it is preferable to leave about eight plants per one hundred inches of row, therefore, the percent of plants which must be removed from the row varies from 38.0 to 85.71% depending on the original stand. Most thinners have a fixed length blade for thinning, therefore, a substantial number of thinning blades must be available for use with such a thinner to be able to accomplish the desired removal from a row of plants. In going from field to field, on the same farm, the plant stand will vary and a different cut will have to be made to leave the desired number of plants in the row. For instance, a thinner which has a forward travel of twenty-eight inches per revolution of a thinning head requires at least ten sets of knives ranging from five-eighths to one and three-quarters inches in width, and the thinner requires two heads per row to be able to make the percentage cut required to leave the optimum number of plants in the rows. This, obviously, indicates that there are a great many combinations of heads and cutters which must be made available if the thinner is to be able to accomplish its purpose. In application Serial No. 21,218, filed April 15, 1948, now United States Patent No. 2,691,333, there is described a thinner which utilizes a thinning head set at about a forty-five degree angle to the angle of travel along the row. The present invention provides a thinning blade or knife which may be used with the device of the patent application, aforementioned, and which is equally adaptable to other types of plant thinners which utilize a head which is set at ninety degrees to the direction of travel along the row.

The present invention provides a head for an agricultural plant thinner in which the thinning blades may be turned from a zero setting or a no cut angle of the blade in relation to the plant row, to a full blade width cut on the plant row. A head for a thinning machine according to the present invention may be set for a thinning cut of from about zero to one hundred percent cut along a crop row. As the blade may be moved from a zero to 100% cut, an infinite combination of the cutting blades may be obtained, and an infinite cut or thin may be taken from a plant row.

It is an object of the present invention to provide a blade for a thinning machine which is adaptable to provide a variable angle of cut along a plant row.

It is another object of the invention to provide a blade for a thinning machine which may be adjusted to cut or thin a predetermined number of plants from a plant row.

It is another object of the invention to provide a thinning head which is adaptable to perform all thinning operations required to thin a plant stand.

It is a still further object of the invention to provide an agricultural thinner head which is adaptable to perform a complete thinning program including a twice over system.

It is a further object of the invention to provide a simplified blade for a thinning machine which is easily installed, adjusted and maintained.

These and other objects and advantages of the present invention may be more readily ascertained by referring to the following description and illustrations in which.

Figure 1:
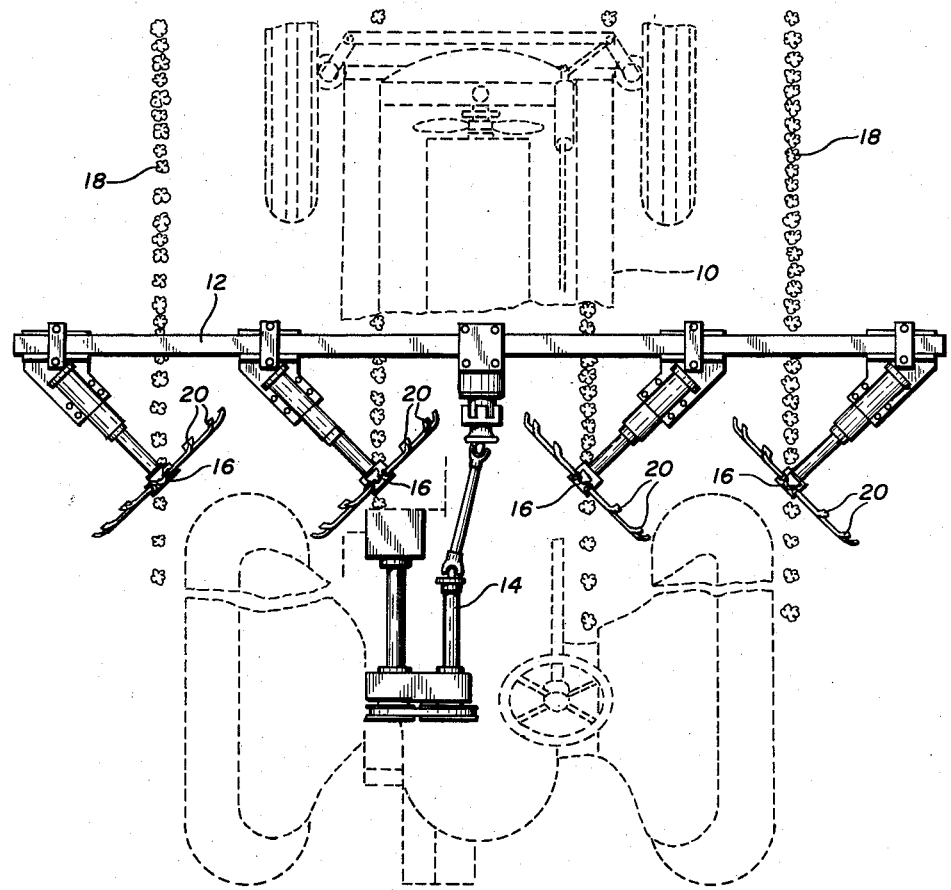
Figure 1 is a top plan view of an agricultural thinner illustrating the position of the thinner heads in relation to rows of plants when mounted on a tractor.
Figure 2:
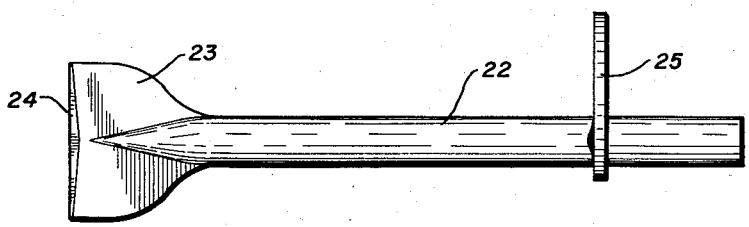
Figure 2 is a top plan view of a thinning blade according to the invention.
Figure 3:
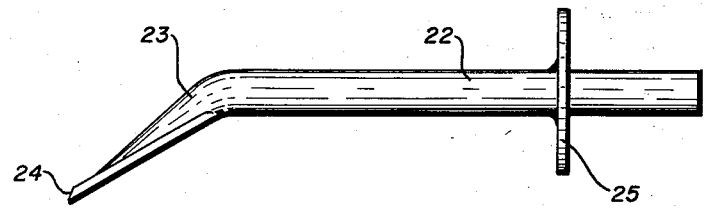
Figure 3 is a side elevation of a thinner blade.

Figure 1 illustrates a tractor 10 in dashed lines, equipped with a four row thinner 12 secured thereto and driven by means of a power take-off drive 14 from the tractor. The thinner 12 includes four thinner heads 16, each set at about a forty-five degree angle to the rows of plants 18. As the tractor 10 travels along rows of the plants 18, the thinner heads 16 rotate so that the thinner knives 20 cut out or thin a portion of each row; the amount cut out of the row depends on the angle at which the blades are set in the thinner head.

Figure 4:
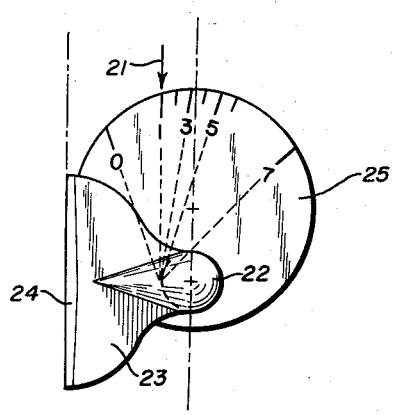
Figure 4 is a top elevation view of a blade showing the indicating scale for determining the angle of approach of the blade to the crop row.

The blade of the invention comprises an elongated shank 22 and a depending head 23 secured to one end. The head 23 includes a cutting edge 24 which extends substantially perpendicularly to the axis of the shank 22 and is spaced equally on each side of the axis of the shank in the plan view. The head 23 is set at an angle of about 30° from the axis of the shank 22 so that the cutting edge 24 is offset from the axis of the shaft. An indicia or indicating scale 25 is secured to the shank. The indicia 25 is a disk securely attached to the shank portion 22. The disk 25 is secured to the shank in a position offset from its axis of rotation or center. The cutting edge 24 of the blade is positioned so that it is substantially parallel to a line extending through the center of the disk and the axis of the shaft 22 illustrated in Fig. 4. The projected lines of the index numbers of the indicia extended from the disk edge tangent to the side of the shank immediately next the blade. A stationary index mark 21 is placed on the head of the thinner. The index numbers are aligned with the index mark for setting the angle of the blades. The index scale is set so that when the knife is placed with index on the zero mark the blade is presented at a no cut angle to the plant row. In other words, the blade edge slices edgewise through the soil without making a cut. At knife index 1 the blade has an effective projected edge of about ⅝ of an inch to the row so that ⅝ of an inch is cut from the row. At index 2 about ¾ of an inch is removed per cut, and so forth, as indicated in Table No. 1 below. The thinner head illustrated in Figure 5 utilizes twelve blades, and the above mentioned graduations are calculated to be accurate when the power take off drive is adjusted to make the heads rotate at a speed to give twelve cuts per twenty-one inches of plant row. In other words, the head rotates approximately one revolution per twenty-one inches of plant row.

The disk 25 is secured to the shaft 22 at a predetermined distance from the blade edge 24 so that the blade may be placed in a holder or head 26 to provide a predetermined circumference for the blade edges. The blades are held on the thinner head in sockets 27 and are maintained in position in the sockets by means of set screws 28. The blades may, also, be held by a clamp ring instead of a set screw for each blade. With the clamp ring, the angle of all the blades may be adjusted by loosening the clamp ring retaining screws providing a simpler maintenance and blade setting procedure. By placing the disk at the correct distance from the cutting edge 24, the disk acts as a spacer for easily and quickly aligning the blades in the holder to provide a correct radius for each of the cutting edges.

Figure 6:
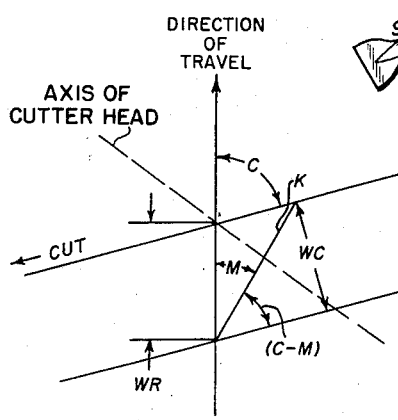
Figure 6 is a diagram illustrating a method for calculating the thining cut a blade makes at various angles of the blade in relation to row.

The diagram of Fig. 6 indicates the direction of travel of the cutter head and the direction of the cut of the blade on the row for a particular setting, but the theory is applicable for any setting. The blade 24 in one convenient size is about 1¾ inches which is satisfactory for a 12 bladed head of about 19 inches in diameter. The width of the row cut is determined by the angle at which the blades are placed in the holders. The angle of cut C with respect to the row is determined by the speed of travel along the row and the rate of rotation of the head. Normally, the angle of cut C will remain constant since the speed of travel with respect to the rotation of the heads is fixed by the drive gearing journalled to the main shaft for rotating each thinner head. The width of the cut $W_C$ measured at right angles to the direction of the cut of the blade K will be slightly smaller than the width of the row cut $W_R$ since the angle C will normally not be 90°. The angle M is the angle of the blade edge mounted with respect to the row. When angle M is zero the percentage of cut of the row is 100%, since twelve cuts of 1¾ inches each per twenty-one inches of row travel or one revolution of the head is twenty-one inches. When the angle M is 90° and angle C is 90°, the cut on the row is about zero since the blades slice edgewise through the row, and any cutting of plants is merely incidental and negligible. By vector analysis, the cut on the row may be determined for any angle of setting for the blades.

From the diagram, it may be determined that, $$\sin C = \frac{W_C}{W_R} \qquad (1)$$

also, $$\sin(C - M) = \frac{W_C}{K} \qquad (2)$$

or combining Equations 1 and 2, $$W_R = \frac{K \sin(C - M)}{\sin C} \qquad (3)$$

Thus with a known blade size K and the required cut $W_R$ (to leave a predetermined plant stand) and knowing angle C, the angle M or blade setting may readily be determined.

With a thinner having twelve blades per head and a thinning head set at a forty-five degree angle, as indicated in the illustration of Fig. 1, the following table gives the number of cuts per twenty-one inches of row and the setting of the knives required to provide for thinning to leave any desired plant population (between approximately 85 to 215 hills) per one hundred feet of row.

Table No. 1

|  | Once Over | | | | | Twice Over | | | | | |
|---|---|---|---|---|---|---|---|---|---|---|---|
|  | | | | | | First time over 6 cuts per 21″ travel set on index No. 7 followed by— | | | | | |
| Cuts Per 21″ Knife Index | 12 No. 1 | 12 No. 2 | 12 No. 3 | 12 No. 4 | 12 No. 5 | 12 No. 1 | 12 No. 2 | 12 No. 3 | 12 No. 4 | 12 No. 5 | 12 No. 6 |
| Percent removed | 35.7 | 42.9 | 50.0 | 57.1 | 64.3 | 67.8 | 71.4 | 75.0 | 78.6 | 82.1 | 85.7 |
| 14 | 108 | 96 | 84 | | | | | | | | |
| 16 | 123 | 110 | 96 | 82 | | | | | | | |
| 18 | 139 | 123 | 108 | 93 | | | | | | | |
| 20 | 154 | 137 | 120 | 103 | 86 | | | | | | |
| 22 | 170 | 151 | 132 | 113 | 94 | 85 | | | | | |
| 24 | 185 | 164 | 144 | 123 | 103 | 92 | 82 | | | | |
| 26 | 201 | 178 | 156 | 133 | 111 | 100 | 89 | | | | |
| 28 | 216 | 192 | 168 | 144 | 120 | 108 | 96 | 84 | | | |
| 30 | | 206 | 180 | 154 | 128 | 116 | 103 | 90 | | | |
| 32 | | 219 | 192 | 164 | 137 | 123 | 110 | 96 | 82 | | |
| 34 | | | 204 | 175 | 146 | 131 | 117 | 102 | 87 | | |
| 36 | | | 216 | 185 | 154 | 139 | 123 | 108 | 92 | | |
| 38 | | | 228 | 195 | 163 | 146 | 130 | 114 | 98 | 82 | |
| 40 | | | | 205 | 171 | 154 | 137 | 120 | 103 | 86 | |
| 42 | | | | 216 | 180 | 162 | 144 | 126 | 108 | 90 | |
| 44 | | | | 226 | 188 | 170 | 151 | 132 | 113 | 94 | |
| 46 | | | | | 197 | 178 | 158 | 138 | 118 | 99 | |
| 48 | | | | | 206 | 185 | 164 | 144 | 123 | 103 | 82 |
| 50 | | | | | 214 | 193 | 171 | 150 | 128 | 107 | 86 |
| 52 | | | | | 223 | 201 | 178 | 156 | 134 | 111 | 89 |
| 54 | | | | | | 208 | 185 | 162 | 139 | 116 | 93 |
| 56 | | | | | | 216 | 192 | 168 | 144 | 120 | 96 |
| 58 | | | | | | 224 | 199 | 174 | 149 | 124 | 99 |
| 60 | | | | | | | 206 | 180 | 154 | 128 | 103 |

Figures are hills per 100 ft. of row. A hill is one inch of row that contains one or more plants.

Table No. 2

| Percent Removed | Leave Between Cuts (inches) | Out (Width of Cuts) (inches) | Total No. of Active Knives Per Wheel | Knife Combinations of Each Wheel No. of Adjacent Knives Set on Index 7 | No. of adjacent Knives Set on "0" (or Removed) |
|---|---|---|---|---|---|
| 16.6 | 8.75 | 1.75 | 2 | 1 | 5 |
| 25 | 5.25 | 1.75 | 3 | 1 | 3 |
| 33.3 | 3.5 | 1.75 | 4 | 1 | 2 |
| 33.3 | 7 | 3.5 | 4 | 2 | 4 |
| 33.3 | 14 | 7 | 4 | 4 | 8 |
| 50 | 1.75 | 1.75 | 6 | 1 | 1 |
| 50 | 3.5 | 3.5 | 6 | 2 | 2 |
| 50 | 5.25 | 5.25 | 6 | 3 | 3 |
| 50 | 10.5 | 10.5 | 6 | 6 | 6 |
| 66.6 | 1.75 | 3.5 | 8 | 2 | 1 |
| 66.6 | 3.5 | 7 | 8 | 4 | 2 |
| 66.6 | 7 | 14 | 8 | 8 | 4 |
| 75 | 1.75 | 5.25 | 9 | 3 | 1 |
| 83.3 | 1.75 | 8.75 | 10 | 5 | 1 |

Figure 5:
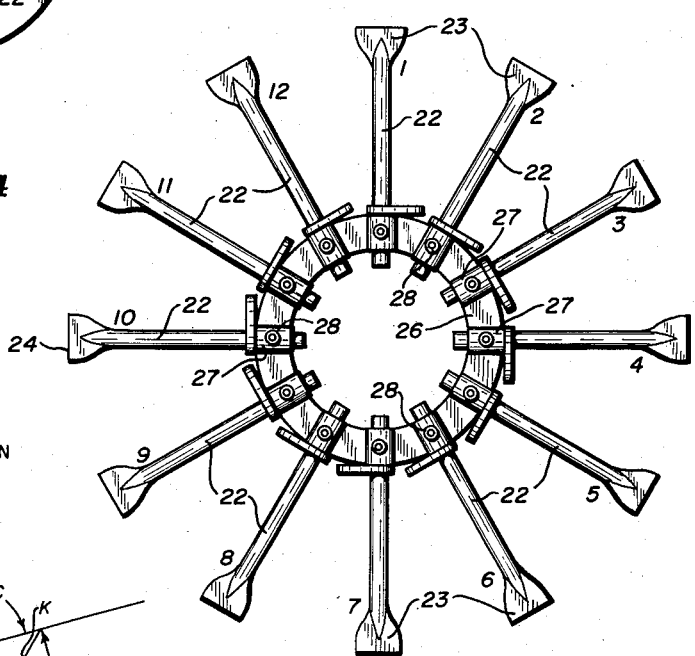
Figure 5 is a plan view of a head for a thinning machine according to the invention illustrating the position of the blades on the head.

From Table No. 1 it is readily seen that for a thin stand, a once over operation for thinning can usually be used. The cut per blade for each index number ranges from ⅝ of an inch to a full blade of 1¾ inches. Where twelve cuts per row are indicated, all blades on the twelve-bladed heads are turned to the index number indicated so as to obtain twelve cuts of the correct size per twenty-one inches of row. For example, where the original stand is eighteen plants per one hundred inches of row, 57.1 percent of the plants must be removed to leave about 93 hills per hundred feet of row. A knife setting of 4 is indicated which will make twelve one inch cuts per twenty-one inches of row. All twelve blades are used so that there will be twelve cuts per twenty-one inches of row.

Where the original stand of plants is heavy, the "twice-over" system may be used. In this case, the first time over operation is performed to reduce the plant stand by about 50%. After the first pass, several days are allowed to permit the plants to straighten up from the thinning treatment, three to seven days being required for sugar beets. The 50% removal is performed by making six 1¾ inch cuts per twenty-one inches of row, or 12 cuts per 42 inches. To obtain six cuts per twenty-one inches of row, every other blade is turned to a zero index setting, or removed from the cutter, so that only six blades are cutting on the plant row. For example, the odd numbered blades, Fig. 5, are turned to zero setting and the even numbered blades are turned to index setting 7 which provides a full 1¾ inch cut on the row. For the second time over, the knives are set to the index number indicated in the table. For example, if the original stand is thirty-four hills per hundred inches of row and it is desired to leave 102 hills per 100 ft., then 75% of the stand must be removed. For the first time over, only six cuts per twenty-one inches of row are used. Six of the blades, i.e., every other blade of the twelve bladed head, are set on index number 7 to give six 1¾ inch cuts per twenty-one inches of row reducing the stand by 50%. On the second time over, in the direction opposite of the first time over, all the blades of the head are set at a knife index number 3, which gives twelve ⅞ inch cuts per twenty-one inches of row. The two operations combined reduces the original stand by 75%.

Since the twice over system cuts a substantial amount of the row, weeds as well as plants are removed. The thinning, therefore, also provides a substantial weeding. The weeding job may be completed after the second time over with the thinner by using ordinary cultivating tools. Since the thinning cuts across the row, the weed population is considerably less than after a normal weeding.

Table No. 2 shows blade settings for blocking combinations for removing a certain percentage of plant population to leave a certain number of inches between various amounts of cut. In block procedures, the width of each cut and the width of the uncut stand between cuts varies. The rotation of the cutter heads is the same as for Table No. 1, i.e., one revolution of the knife wheels per twenty-one inches of tractor travel. For a blocking run on a particular field, Table No. 2 gives the most commonly used cuts. For example, when 33.3% of the plant population is to be removed and it is desired to have seven inches of plant removal and fourteen inches of plant stand, four knives are used to cut the row and each of the four adjacent knives are set on index number seven. This, of course, leaves eight knives which must be set on "0" or removed from the cutter head. Following the table a similar arrangement may be used for various blocking purposes.

While the above illustration has been given for sugar beets growing in a particular area, the same type of table may be calculated for any crop which is machine thinned, and such a table may be provided for any number of plants to be left in a unit measure of row. For example, in some areas of the world it is feasible to leave as high as 200 sugar beet hills per hundred feet of row. Normally, the first time over with a mechanical thinner removes a standard amount, e.g., 33.3% as indicated above. As the effective cut on the row can be varied from zero to full width of the blade, it is possible to make an exact cut to remove the required number of plants per row. The blade and the thinning head of the present invention is a simplified and novel device which simplifies equipment and use thereof for thinning agricultural plants. The thinner head and blade combination can be adjusted to produce any type of thinning required in agriculture where a bladed thinner removes a portion of the original plant stand of a row of plants. Where the prior art has required multiple heads and multiple sizes of blades, the present invention provides a single head with a single set of blades to perform all the functions of the multiple combinations of the prior art. Also, the machine may be used for blocking operations if desired, as shown in Table No. 2.

The number of blades per thinning head and the size of the cutting edge will depend on the speed of travel of the thinner along the row and the rotation of the head. Thus, thinning heads having 8, 12, 16, etc. blades may be utilized by utilizing correct forward travel and rotation. It is preferable to provide for a zero to one hundred percent cut of the row by correlating the cutter head rotation to the travel of the tractor. The blades for the cutter head provide an inexpensive and highly versatile device, capable of thinning a plant row from zero to one hundred percent, and providing an infinite number of blocking combinations with a single set of blades for a single cutter head. All known thinning and blocking procedures may be performed by the single head and the single set of knives. The variable blades, furthermore, permit changing the tractor speed in relation to cutter head rotation and still provide the flexilibity of the machine. Simple calculations will provide a table such as Table No. 1 for any type or condition of plant life. Since the blades may be turned to cut 100% of a plant row, the device has other agricultural uses.

While the cutter heads are illustrated as mounted under the tractor, they may be mounted in the various positions well known in the art. Also, the placement of the plane of rotation through the cutter head may be changed from the illustrated 45° angle to its line of travel to substantially any desired angle. An acute angle to the row is preferred since it permits the blade to make a smooth cut on the row. The highly flexible cutter head assembly permits a substantial variation of the angle of the head in relation to its line of travel and still retains its versatility in thinning and blocking.

The invention has been illustrated by reference to a specific embodiment, but there is no intent to limit the invention to the precise details so described except insofar as set forth in the following claims.

We claim:

1. In a plant thinning and blocking machine, a rotary hub for holding a plurality of radially extending thinning knives, each knife including a round rotatable shaft mounted in a round peripheral opening on said hub, each knife including a cutting head having a cutting edge normal to and offset from the longitudinal axis of the shaft, a thin disc mounted rigidly on said shaft extending radially from the longitudinal axis thereof a substantial distance from the surface of the shaft and spaced from said head, said disc providing a stop for said shaft in said hub to predetermine the rotary radius of the cutting edge of said knife blade, and an index scale mounted on said disc facing said cutting edge and cooperative with the hub to preselect the angle to which the knife edge addresses the line of travel of said hub and thereby preselect the amount of crop row contacted by the cutting edges of the knives during each revolution of the hub as it travels along the crop rows.

2. A device according to claim 1 in which said disc is offset on said shaft for providing a scale which extends substantially across the width of said disc.

3. In a platn thinning and blocking machine, a rotary hub for holding a plurality of radially extending thinning knives, each knife including a round rotatable shaft mounted in a round peripheral opening on said hub, each knife including a cutting head having a cutting edge normal to and offset from the longitudinal axis of the shaft, said cutting edge extending outwardly from said head at one end of said shaft and generally intersecting a plane perpendicular thereto and passing through the axis of said shaft, a thin disc mounted rigidly on each said shaft extending radially from the longitudinal axis thereof and extending a substantial distance from the surface of said shaft and spaced from each said head, said disc providing a stop for said shaft in said hub to predetermine the rotary radius of the cutting edge of each said knife, and an index scale mounted on each said disc facing said cutting edge and coperative with the hub to preselect the angle to which the knife edge addresses the line of travel of said hub and thereby preselect the amount of crop row contacted by the cutting edges of the knives during each revolution of the hub as it travels along the crop rows.

4. A knife blade for a plant thinning and blocking machine comprising an elongated shank, a cutting head extending generally axially of said shank and having a cutting edge mounted generally normal to the axis through said shank in position to present the cutting edge for use, a thin disc mounted on the shank and extending in a plane normal to the axis thereof at a point remote from said head, said disc extending a substantial distance beyond the surface of said shank and arranged to position the knife blade in a holder with its cutting edge at a predetermined rotary radius, and a calibrated scale on said disc facing said cutting head for preselecting the angle at which said cutting edge addresses associated plant rows so as to preselect the amount of plant row contacted by the cutting edge by each revolution of its holder.

References Cited in the file of this patent

UNITED STATES PATENTS

| | | |
|---|---|---|
| 409,718 | Vibert | Aug. 27, 1889 |
| 707,472 | Welter et al. | Aug. 19, 1902 |
| 1,208,514 | Davendorf | Dec. 12, 1916 |
| 1,302,015 | Dewey | Apr. 29, 1919 |
| 2,341,830 | Uddenborg | Feb. 15, 1944 |
| 2,691,333 | Shumaker | Oct. 12, 1954 |
| 2,699,713 | Jamison | Jan. 18, 1955 |

FOREIGN PATENTS

| | | |
|---|---|---|
| 150,569 | Australia | Mar. 20, 1953 |